United States Patent [19]

Hooykaas

[11] Patent Number: 5,028,338

[45] Date of Patent: Jul. 2, 1991

[54] PROCESS FOR IMMOBILIZING ENVIRONMENTALLY NOXIOUS METALS AND ORGANIC SUBSTANCES

[75] Inventor: Carel W. J. Hooykaas, Rotterdam, Netherlands

[73] Assignee: Pelt & Hooykaas, Rotterdam, Netherlands

[21] Appl. No.: 521,397

[22] Filed: May 10, 1990

[30] Foreign Application Priority Data

May 18, 1989 [NL] Netherlands ............... 8901240

[51] Int. Cl.$^5$ .............................................. B01D 15/08
[52] U.S. Cl. .................................. 210/679; 210/690; 210/691; 210/751; 210/908; 210/909
[58] Field of Search ............... 210/751, 908, 909, 679, 210/691, 690

[56] References Cited

U.S. PATENT DOCUMENTS

| | | | |
|---|---|---|---|
| 4,028,130 | 6/1977 | Webster et al. | 210/751 |
| 4,650,590 | 3/1987 | Beall | 210/908 |
| 4,740,488 | 4/1988 | Fogler et al. | 502/84 |

FOREIGN PATENT DOCUMENTS 0139788 5/1985 European Pat. Off.
8301206 4/1983 PCT Int'l Appl.

Primary Examiner—Peter Hruskoci
Assistant Examiner—Krisanne Shideler
Attorney, Agent, or Firm—Edmund M. Jaskiewicz

[57] ABSTRACT

A process is disclosed for immobilizing environmentally noxious organic, particularly aromatic, substances by absorbing them on a layered clay mineral modified by exchange with a quaternary ammonium compound, thereby increasing the spacing between the layers and rendering the adsorption surfaces hydrophobic.

After adsorption of the organic compounds the spacing between the layers of the layered clay mineral is reduced by a layer spacing reducing agent, and subsequently the clay mineral containing the organic compounds is mixed with a hardenable inorganic binder and the whole is hardened.

A typical example of a modifying agent is a quaternary ammonium compound, and of a layer spacing reducing agent an alkaline substance, such as sodium hydroxide.

Typical clay minerals are chosen among the smectite minerals, tectosilicates and phyllosilicates; preferably montmorillonite clay is used.

The inorganic binder may be a calcium hydroxide compound or a calcium containing cement, preferably containing fly ash.

9 Claims, 1 Drawing Sheet

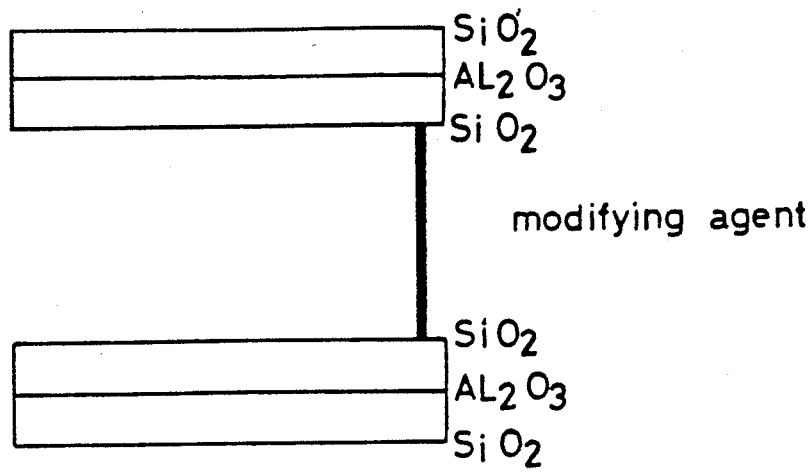
_Fig. 1._
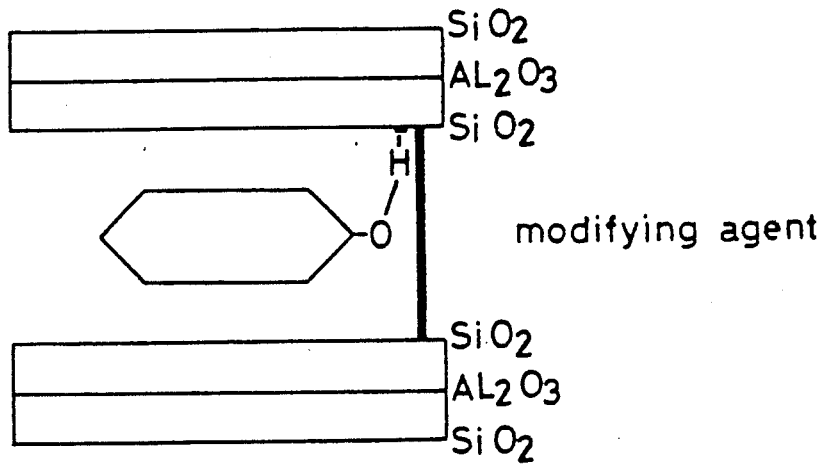
_Fig. 2._
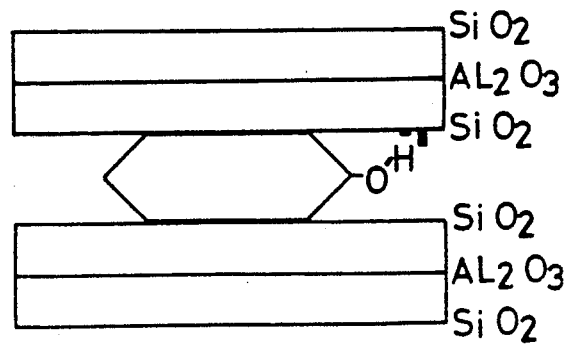
_Fig. 3._

PROCESS FOR IMMOBILIZING ENVIRONMENTALLY NOXIOUS METALS AND ORGANIC SUBSTANCES

BACKGROUND OF THE INVENTION

The invention relates to a process for immobilizing environmentally noxious substances by mixing with a hardenable binder and hardening the mixture to form a hard material.

DESCRIPTION OF THE PRIOR ART

A process for immobilizing waste containing noxious metals by mixing the same in an aqueous medium with Portland cement and an aluminium silicate or aluminosilicate in the form of fly ash, followed by allowing this material to harden to form a rock-like product is known. No noxious metals can be leached out of such a rock-like product, with the result that said product can be stored in the soil without difficulty.

Said process is, however, unsatisfactory for immobilizing organic waste since, as a result of the slight interaction between the organic material and the cement-like matrix of the product, soluble organic and insoluble organic substances can readily be leached out by ground or rain water.

In order to eliminate this difficulty, it is known to adsorb organic substances on an additive. Additives mentioned in the literature are varieties clay modified with alkylammonium compounds in which the interlaminar spacing between the layers of the clay has been increased and the adsorption surfaces of the clay have been opened in order to increase the adsorption of organic molecules, the adsorption surfaces of the clay, In addition, having been rendered no longer hydrophilic but organophilic.

A difficulty in using such varieties of clay modified, in particular, with alkylammonium compounds is that, after the adsorption of the organic compounds, the interlaminar spacings between the layers of the varieties of clay continue to exist, as a result of which desorption of the organic compound from the variety of clay is nevertheless possible, with the consequence that the organic compounds can again readily be leached out of the hard rock-like product obtained.

SUMMARY OF THE INVENTION

It is now an object of the invention to provide a process in which the risk of desorption of the organic compounds from such modified varieties of clay is considerably reduced.

This object is achieved, according to the invention, in that a process for immobilizing environmentally noxious organic substances by adsorbing them on layered natural or synthetic adsorption compounds modified by exchange with modifying agents containing groups which increase the spacing between the layers of the adsorption compound and render the adsorption surfaces of the layered adsorption compound hydrophobic, after which the adsorption compounds obtained, which have adsorbed the organic substances, are mixed with an organic binder and the whole is hardened, wherein, after adsorption of the organic substances, the spacing between the layers of the layered adsorption compound is reduced by means of a layer-spacing reducing agent. By reducing the spacing between the layers of the layered adsorption compound, the adsorbed organic substances are very well encapsulated in the layered adsorption compound, with the result that said organic substances can no longer readily be desorbed and therefore subsequently leached out of the hardened product.

With particular advantage, the spacing between the layers of the layered adsorption compound is reduced by removing groups from the modifying agent which are responsible for increasing the spacing.

Advantageously, the layered adsorption compound is composed of a clay mineral, in particular a smectite modified by exchange with quaternary ammonium compounds, in particular quaternary ammonium salts.

Expediently, the layered adsorption compound is chosen from synthetic and natural tectosilicates and phyllosilicates. As examples of tectosilicates, mention may be made of ultramarine compounds, synthetic zeolites in the form of zeolite A, zeolite X, zeolite Y, zeolite and zeolite, and natural zeolites such as chabazite, erionite, heulandite, mordenite and clinoptilonite.

Examples of phyllosilicates are attapulgite, vermiculite, montmorillonite, bentonite, ilite, micas and hydromicas, kaolin and chrysotile.

Preferably, the adsorption compound is composed of montmorillonite.

Advantageously, use is made of an alkylphenylammonium salt as modifying agent for modifying the layered clay minerals, the alkylphenyl ammonium group being exchanged for the sodium, potassium and/or calcium ions present in the layered clay mineral.

If use is made of a quaternary trialkylphenylammonium compound, an alkaline substance which yields a dialkylphenylamine and an alkene compound when exposed to heat is preferably used as layer-spacing reducing agent.

The dodecyl group, which increases the layer spacing, is detached from a phenyldimethyldodecylamine group, which is attached to an active site of the montmorillonite, when exposed to an alkali hydroxide.

DESCRIPTION OF THE DRAWINGS

The accompanying FIG. 1 shows diagrammatically two layers of montmorillonite modified by exchange with an alkylphenylammonium compound and FIG. 2 shows the way in which an organic compound in the form of phenol is received between the two layers held at an increased spacing, each composed of an $SiO_2 \cdot Al_2O_3 \cdot SiO_2$ layer.

Finally, FIG. 3 shows the same state as in FIG. 2 but after reducing the increased spacing between the two layers.

In particular, aromatic compounds such as benzene, phenol, chlorophenol compounds, chloronaphthalene compounds, nitrobenzene, triethanolamine, chloroaniline, PCBs, dioxins and dibenzofurans, halogenated hydrocarbons and the like can be adsorbed well with the aid of clay minerals, more particularly montmorillonite, modified by alkylammonium compounds.

It will be clear that the process according to the invention offers particularly great advantages in immobilizing environmentally noxious organic aromatic substances.

To improve the immobilization of organic compounds, they may advantageously be chemically bound to a group of the modifying agent, such as by a Diels-Alder reaction or a Friedel-Crafts reaction. Specifically, trichloromethane may react with a phenyl group of a modifying agent by a Friedel-Crafts reaction to form a triphenylmethyl group and hydrogen chloride.

The invention will now be illustrated by means of a number of exemplary embodiments.

EXAMPLE 1.

A montmorillonite clay in the form of a bentonite clay is finely ground to a particle size of approximately 200 mesh, after which the clay is dried and then converted into the sodium form by treating it for 20 hours with 100 ml of aqueous 1M sodium chloride. After removing the supernatant salt solution by centrifugation and again treating the clay with a fresh molar salt solution, the sodium form of the montmorillonite clay was treated with benzyldimethyltetradecyl ammoniumchloride.

In this process, the alkylammonium groups are exchanged for the sodium ions of the modified bentonite clay.

After completion of the exchange, the modified clay was washed well with water, dried and again ground to a powder.

The modified bentonite clay obtained was then treated with a phenol solution, the phenol present being virtually completely adsorbed in the modified bentonite clay.

After treatment with the phenol-containing solution, 2 kilograms of the phenol-containing clay were mixed with sodium hydroxide as a layer-spacing reducing agent, as a result of which the tetradecyl group was detached with heat being supplied. Then mixing was carried out with 40 kilograms of Portland cement and 40 liters of water in a container, after which 10 kilograms of fly ash were added.

The mixture obtained was allowed to harden for 28 days.

It was not possible to extract any phenol from the blocks obtained, whereas, without using a layer-spacing reducing agent, a small quantity of phenol can in fact be detected in the extract.

EXAMPLE 2.

Example 1 is repeated but trimethylphenylammonium chloride is used as modifying agent for the bentonite clay.

In this case, too, phenol is excellently adsorbed.

After the adsorption, the spacing between the layers of the bentonite clay is reduced by adding a potassium hydroxide as layer-spacing reducing agent.

After mixing with Portland cement and fly ash in accordance with Example 1 and hardening, blocks are obtained from which no phenol can be extracted.

If treatment with a layer-spacing reducing agent is omitted, a certain quantity of phenol can in fact be extracted from the blocks.

EXAMPLE 3.

Bentonite clay is modified with hexadecyltrimethylammonium bromide and the modified bentonite clay obtained is used to adsorb chloronaphthalene.

By using sodium hydroxide as layer-spacing reducing agent, an excellent adsorption of the chloronaphthalene is obtained which can no longer be extracted from the blocks obtained after hardening in accordance with Example 1.

EXAMPLE 4.

Example 1 is repeated, but chloroaniline is adsorbed as organic aromatic compound, after which the chloroaniline is chemically bound to the modifying agent by a Friedel-Crafts reaction.

After using sodium hydroxide as layer-spacing reducing agent, the chloroaniline can virtually no longer be extracted.

What is claimed is:

1. A process for immobilizing environmentally noxious organic substances comprising absorbing them on natural or synthetic layered adsorption compounds modified by exchange with modifying agents containing groups which increase the spacing between the layers of the adsorption compound and render the adsorption surfaces of the layered adsorption compound hydrophobic, after which the adsorption compounds obtained, which have adsorbed the organic substances, are mixed with an inorganic binder and the whole is hardened, and wherein, after the adsorption of the organic substances, the spacing between the layers of the layered adsorption compound is reduced with the aid of a layer-spacing reducing agent comprising a compound which removes layer-spacing groups from the modifying agent.

2. A process according to claim 1, wherein the layered adsorption compound is a clay mineral comprising a smectite compound.

3. A process according to claim 1, wherein the layered adsorption compound is chosen from synthetic and natural tectosilicates and phyllosilicates.

4. A process according to claim 3, wherein the clay mineral is a montmorillonite clay.

5. A process according to claim 1, wherein the modifying agent is a quaternary ammonium compound.

6. A process according to claim 5, wherein, the layer-spacing reducing agent is chosen from an alkaline substance.

7. A process according to claim, 1, wherein the organic substances are aromatic organic substances.

8. A process according to claim 1, wherein the inorganic binder is composed of a calcium-containing cement mixed with an aluminium silicate and/or a aluminosilicate.

9. A process according to claim 8, wherein the aluminosilicate is fly ash.

* * * * *